US012737102B2

(12) United States Patent
Kuwamoto et al.

(10) Patent No.: US 12,737,102 B2
(45) Date of Patent: Sep. 15, 2026

(54) GRAPHIC DESIGN SYSTEM UTILIZING VARIABLE DATA STRUCTURES FOR PERFORMING SIMULATIONS WHERE ATTRIBUTES OF STATEFUL DESIGN ELEMENTS ARE DYNAMICALLY DETERMINED

(71) Applicant: Figma, Inc., San Francisco, CA (US)

(72) Inventors: Sho Kuwamoto, San Francisco, CA (US); Shana Hu, San Francisco, CA (US); Amanda Yeh, San Francisco, CA (US); Nikolas Klein, San Francisco, CA (US); Jacob Miller, San Francisco, CA (US); Shreya Sudarshana, San Francisco, CA (US); Garrett Miller, San Francisco, CA (US)

(73) Assignee: Figma, Inc., San Francisco, CA (US)

( * ) Notice: Subject to any disclaimer, the term of this patent is extended or adjusted under 35 U.S.C. 154(b) by 159 days.

(21) Appl. No.: 18/749,399

(22) Filed: Jun. 20, 2024

(65) Prior Publication Data

US 2024/0427482 A1 Dec. 26, 2024

Related U.S. Application Data

(60) Provisional application No. 63/522,089, filed on Jun. 20, 2023.

(51) Int. Cl.
*G06F 3/04847* (2022.01)
*G06F 8/38* (2018.01)
*G06T 11/60* (2006.01)

(52) U.S. Cl.
CPC ............ *G06F 3/04847* (2013.01); *G06F 8/38* (2013.01); *G06T 11/60* (2013.01)

(58) Field of Classification Search
CPC ................................................ G06F 3/048–05
See application file for complete search history.

(56) References Cited

U.S. PATENT DOCUMENTS 7,752,559 B1 7/2010 Szpak
8,312,416 B2 11/2012 Freund
(Continued)

FOREIGN PATENT DOCUMENTS

EP 3719752 10/2020
JP 2008-21221 1/2008
(Continued)

OTHER PUBLICATIONS

Bibliographic information for "Figma Tutorial: Build and present interactive prototypes", https://www.youtube.com/watch?v=X5qiBwqptek, Feb. 5, 2024, 2 pages.
(Continued)

*Primary Examiner* — Daniel Rodriguez
(74) *Attorney, Agent, or Firm* — Squire Patton Boggs LLP; Sarah Mirza

(57) ABSTRACT

A computer system is operable to associate each of a first and second layer of a graphic design with a variable data structure. The first layer includes a component that is associated with multiple instances that collectively define multiple states that are associated with the component. The computer system can perform a simulation of the graphic design being deployed in a production environment by (i) setting an active value for the variable data structure based on an attribute of one of the multiple instances of the component; and (ii) automatically configuring an attribute of the object of the second layer based on the active value of the variable data structure.

15 Claims, 9 Drawing Sheets

(56) References Cited

U.S. PATENT DOCUMENTS

| | | | |
|---|---|---|---|
| 10,114,733 B1 | 10/2018 | Varghese et al. | |
| 10,181,059 B1 | 1/2019 | Brewton et al. | |
| 10,997,217 B1 | 5/2021 | Nielsen et al. | |
| 11,269,501 B2 | 3/2022 | Wichary et al. | |
| 2007/0006136 A1 | 1/2007 | Hirschberg et al. | |
| 2007/0240080 A1* | 10/2007 | Eldridge | G06F 3/0486 717/113 |
| 2008/0036776 A1 | 2/2008 | Niles | |
| 2009/0187860 A1* | 7/2009 | Fleck | G06F 3/04847 715/834 |
| 2010/0017695 A1 | 1/2010 | Palmieri | |
| 2010/0077330 A1* | 3/2010 | Kaplan | G06F 3/0481 715/764 |
| 2012/0233037 A1* | 9/2012 | Lamoureux | G06F 3/0482 705/27.2 |
| 2012/0254733 A1* | 10/2012 | Tucovic | G06F 40/106 715/243 |
| 2013/0086529 A1 | 4/2013 | Singh et al. | |
| 2013/0239001 A1 | 9/2013 | Maloney et al. | |
| 2014/0071133 A1 | 3/2014 | Chu | |
| 2014/0195901 A1* | 7/2014 | DeBlois | G06Q 30/0276 715/256 |
| 2014/0356822 A1 | 12/2014 | Hoque | |
| 2016/0048388 A1 | 2/2016 | Eksten | |
| 2016/0274776 A1 | 9/2016 | Scheff | |
| 2016/0371312 A1* | 12/2016 | Ben-Aharon | G06F 8/38 |
| 2017/0221253 A1 | 8/2017 | Banerjee et al. | |
| 2018/0174346 A1 | 6/2018 | Fratarcangeli | |
| 2018/0268608 A1 | 9/2018 | Schneider | |
| 2018/0308276 A1 | 10/2018 | Cohen | |
| 2019/0035149 A1 | 1/2019 | Chen | |
| 2019/0196694 A1* | 6/2019 | Youngblood | H04N 21/8456 |
| 2019/0206106 A1 | 7/2019 | Martin et al. | |
| 2019/0325626 A1 | 10/2019 | Tao | |
| 2020/0311281 A1 | 10/2020 | Boulton | |
| 2021/0216701 A1 | 7/2021 | Qu | |
| 2021/0241508 A1* | 8/2021 | Cichon | G06T 11/60 |
| 2022/0012071 A1 | 1/2022 | Kim | |
| 2022/0083316 A1* | 3/2022 | Andersson | G06F 8/24 |
| 2022/0101582 A1* | 3/2022 | Uzgin | G06T 11/60 |
| 2022/0245618 A1* | 8/2022 | King | G06T 15/503 |
| 2023/0003197 A1 | 1/2023 | Huff | |
| 2023/0219970 A1 | 7/2023 | Ban et al. | |
| 2023/0306667 A1 | 9/2023 | Hopkins | |
| 2023/0386118 A1 | 11/2023 | Klein | |
| 2023/0400971 A1 | 12/2023 | Tai | |
| 2023/0418562 A1 | 12/2023 | Andersson | |
| 2024/0023681 A1 | 1/2024 | Wilson et al. | |
| 2024/0111405 A1 | 4/2024 | Harvill | |
| 2024/0143869 A1 | 5/2024 | Klein | |
| 2024/0144443 A1 | 5/2024 | Sharma et al. | |

FOREIGN PATENT DOCUMENTS

| | | |
|---|---|---|
| WO | 2022061027 | 3/2022 |
| WO | 2022061027 A1 | 3/2022 |
| WO | 2023219970 | 11/2023 |
| WO | 2024091964 | 5/2024 |
| WO | 2024091964 A1 | 5/2024 |
| WO | 2024034855 | 6/2024 |
| WO | 2024034864 | 6/2024 |
| WO | 2024034867 | 6/2024 |

OTHER PUBLICATIONS

Bibliographic information for "Figma Tutorial: Prototyping", https://www.youtube.com/watch?v=sAAa-CCOcg, Feb. 27, 2024, 2 pages.

International Preliminary Report on Patentability mailed Jul. 2, 2024, for related PCT/US2021/050734, filed Sep. 16, 2021, 8 pages.

International Search Report and The Written Opinion of The International Searching Authority mailed Aug. 23, 2023, for related PCT/US2023 filed May 8, 2023, 11 pages.

International Search Report and The Written Opinion of The International Searching Authority mailed Dec. 22, 2021, for related PCT/US2021/050734 filed Sep. 16, 2021, 66 pages.

International Search Report and The Written Opinion of The International Searching Authority mailed Feb. 16, 2024, for related PCT/US2023/077671, filed May 2, 2024, 11 pages.

Jarzabek et al., "XVCL: XML-based Variant Configuration Language", IEEE, pp. 1-2 (Year: 2003).

Kriouile et al., "Towards Flexible and Reusable SaaS for Multi-tenancy", IEEE, pp. 1-7 (Year: 2014).

Paper by Figma—"Frames in Figma", URL https://web.archive.org/web/20221004002738/ https://help.figma.com/hc/en-us/articles/360041539473-Frames-in-Figma , Oct. 10, 2022, 11 pages.

Paper by Figma—"Guide to Prototyping in Figma", URL https://web.archive.org/web/2022102202/0956 https://help.figma.com/hc/en-us/articles/360040314193 "Flows and Starting Points" "Create Connections", Oct. 22, 2022, 8 pages.

Paper by WeTransfer—Simple Sketch App, "Creativity at your fingertips" URL:https://web.archive.org/web/20220121205009/https://wetransfer.com/paper, 9 pages.

Written Opinion of The International Preliminary Examining Authority mailed Apr. 10, 2024, for related PCT/US2021/050734, filed Sep. 16, 2021, 7 pages.

Non-Final Office Action received for U.S. Appl. No. 18/749,359 dated Dec. 4, 2025, 38 pages.

Bezier Animations, UI Elements to Flutter Widgerts (Part 1), by Kamalesh Basu, Published in TheBrand.app on Jan. 29, 2020. 25 pages.

International Search Report and Written Opinion mailed Aug. 12, 2024 in PCT/US2024/034867.

International Search Report and Written Opinion mailed Aug. 20, 2024 in PCT/US2024/034864.

International Search Report and Written Opinion mailed Sep. 4, 2024 in PCT/US2024/034855.

Prototyping Easing Curves, The Wayback Machine by Figma Help Center. Found at:https://web.archive.org/web/20240000000000*/Prototyping%20Easing%20Curves7 pages.

Written Opinion of the International Preliminary Examining Authority mailed Sep. 16, 2024, for related PCT/US2023/0076500, filed Oct. 10, 2022, 6 pages.

Written Opinion of The International Preliminary Examining Authority mailed Sep. 18, 2024, for related PCT/US2023/0077671, filed Oct. 24, 2023, 8 pages.

Final Office Action received for U.S. Appl. No. 18/749,359 dated May 27, 2026, 31 pages.

Non-Final Rejection received for U.S. Appl. No. 18/749,422 dated Jun. 3, 2026, 31 pages.

* cited by examiner

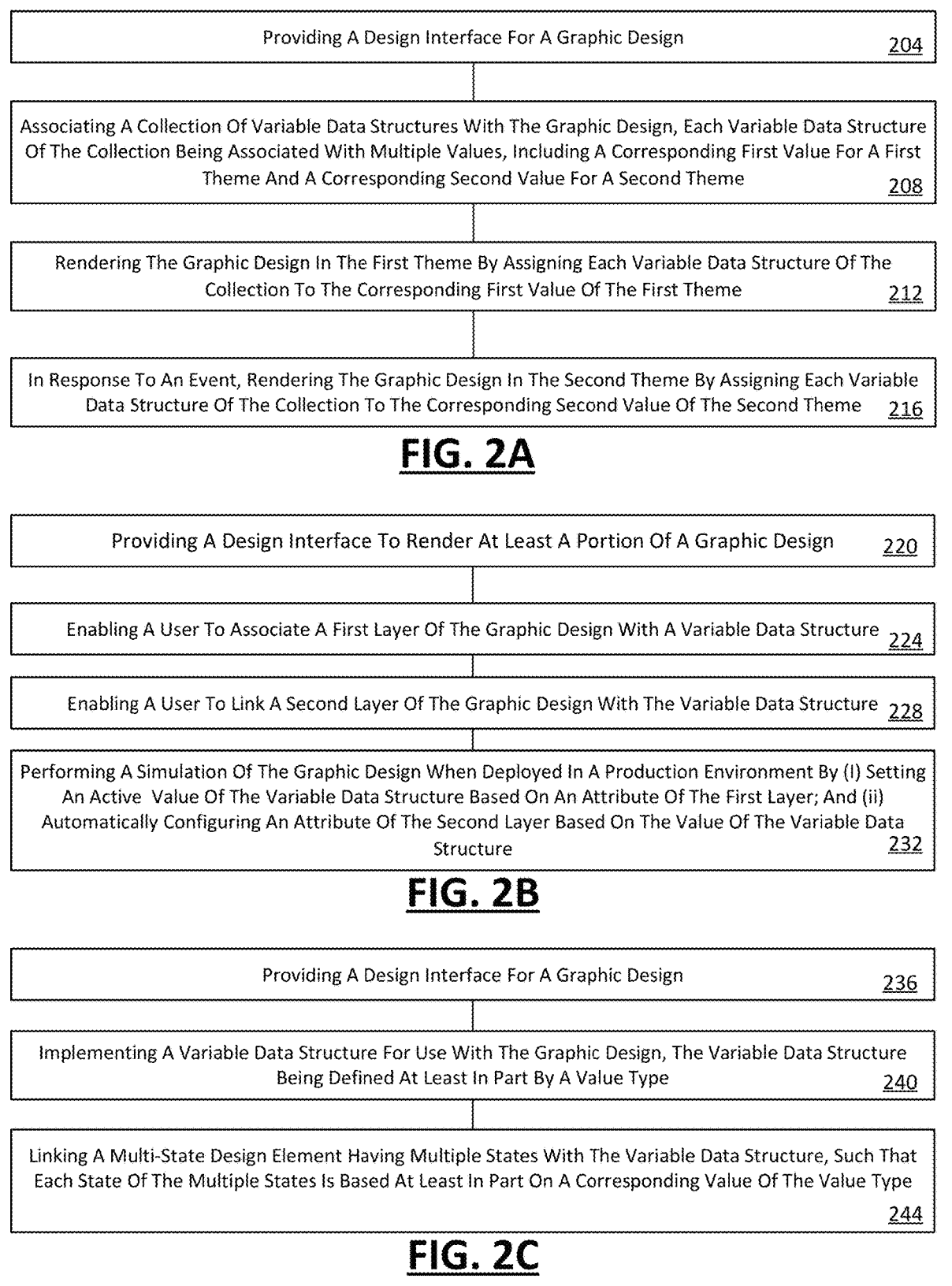

Providing A Design Interface For A Graphic Design 204

Associating A Collection Of Variable Data Structures With The Graphic Design, Each Variable Data Structure Of The Collection Being Associated With Multiple Values, Including A Corresponding First Value For A First Theme And A Corresponding Second Value For A Second Theme 208

Rendering The Graphic Design In The First Theme By Assigning Each Variable Data Structure Of The Collection To The Corresponding First Value Of The First Theme 212

In Response To An Event, Rendering The Graphic Design In The Second Theme By Assigning Each Variable Data Structure Of The Collection To The Corresponding Second Value Of The Second Theme 216

FIG. 2A

Providing A Design Interface To Render At Least A Portion Of A Graphic Design 220

Enabling A User To Associate A First Layer Of The Graphic Design With A Variable Data Structure 224

Enabling A User To Link A Second Layer Of The Graphic Design With The Variable Data Structure 228

Performing A Simulation Of The Graphic Design When Deployed In A Production Environment By (I) Setting An Active Value Of The Variable Data Structure Based On An Attribute Of The First Layer; And (ii) Automatically Configuring An Attribute Of The Second Layer Based On The Value Of The Variable Data Structure 232

FIG. 2B

Providing A Design Interface For A Graphic Design 236

Implementing A Variable Data Structure For Use With The Graphic Design, The Variable Data Structure Being Defined At Least In Part By A Value Type 240

Linking A Multi-State Design Element Having Multiple States With The Variable Data Structure, Such That Each State Of The Multiple States Is Based At Least In Part On A Corresponding Value Of The Value Type 244

Edit color style ×

Name: extra large

Token name: radius-extra-large

Description: Used for larger UI elements

321

Value 40

Used for

☐ Spacing (Auto layout)

☐ Sizing (Width, Height)

☑ Radius

GRAPHIC DESIGN SYSTEM UTILIZING VARIABLE DATA STRUCTURES FOR PERFORMING SIMULATIONS WHERE ATTRIBUTES OF STATEFUL DESIGN ELEMENTS ARE DYNAMICALLY DETERMINED

RELATED APPLICATIONS

This application claims benefit of priority to provisional U.S. Patent Application No. 63/522,089, filed Jun. 20, 2023; the aforementioned priority application being hereby incorporated by reference in its entirety.

TECHNICAL FIELD

Examples described herein relate to a graphic design system, and more specifically, a graphic design system utilizing a variable data structure for performing simulations.

BACKGROUND

Software design tools have many forms and applications. In the realm of application user interfaces, for example, software design tools require designers to blend functional aspects of a program with aesthetics and even legal requirements, resulting in a collection of pages which form the user interface of an application. For a given application, designers often have many objectives and requirements that are difficult to track.

BRIEF DESCRIPTION OF THE DRAWINGS

FIG. 2A illustrates an example method for utilizing a variable data structure with a graphic design, according to one or more embodiments.

FIG. 2B illustrates an example method for utilizing a variable data structure to determine an attribute of a design element, according to one or more embodiments.

FIG. 2C illustrates an example method for utilizing a variable data structure to simulate a graphic design in a production environment, according to one or more embodiments.

FIG. 3F illustrates application of expressions for determining an active value of a stateful layer for implementation during a simulation mode, according to one or more embodiments.

DETAILED DESCRIPTION

Figure 1:
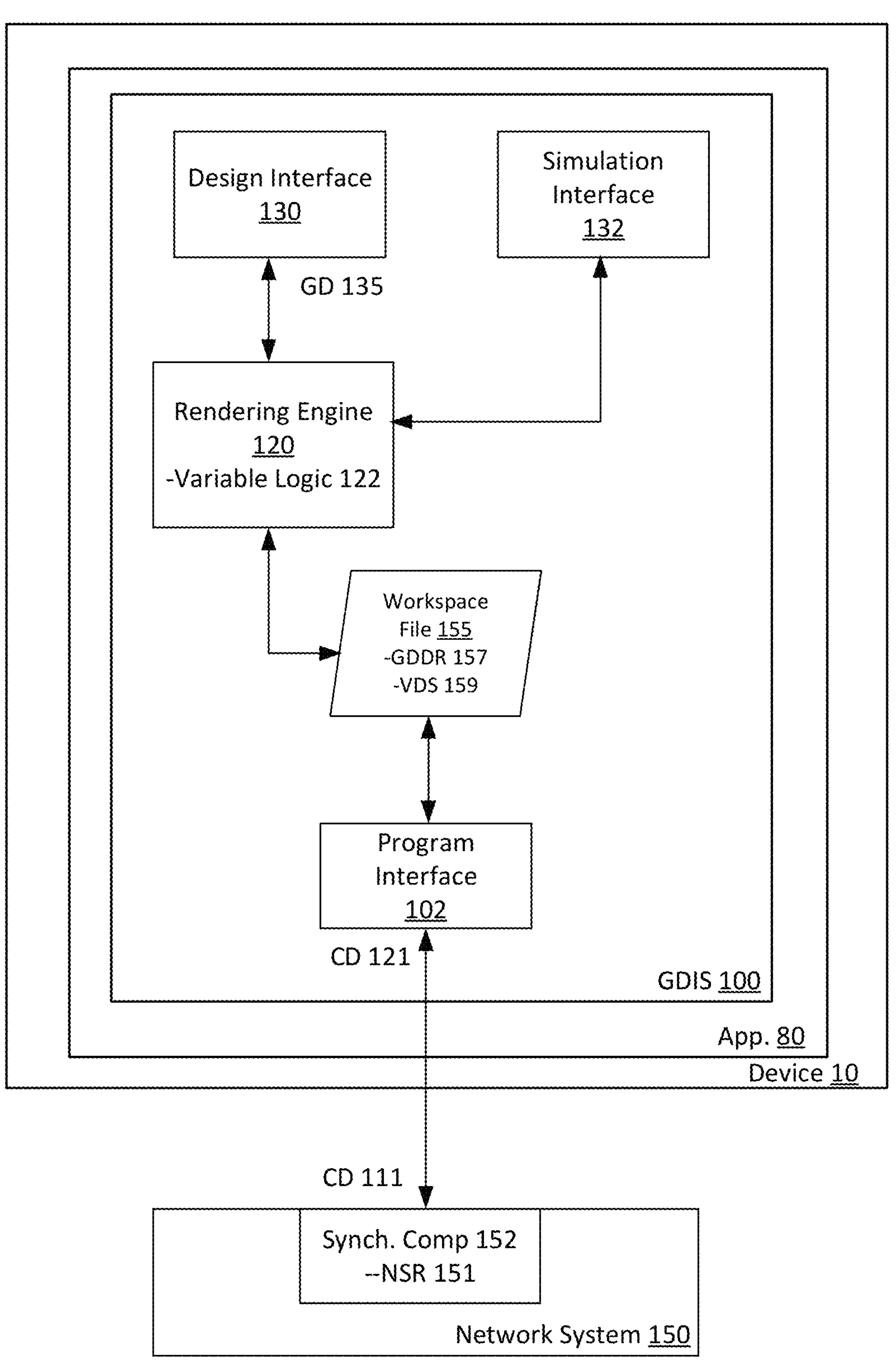
FIG. 1 illustrates a graphic design system in accordance with one or more embodiments.

In examples, a graphic design system provides a design interface for a graphic design. The design interface can include tools and other interactive functionality for enabling a user to create and/or update a graphic design. The graphic design can include design elements that are rendered by the integrated graphic design system on a canvas. In some examples, the integrated graphic design system can provide a collaborative environment for multiple users to concurrently update a graphic design.

In examples, the graphic design can be structured or otherwise represented by a hierarchical arrangement of layers, where individual layers correspond to a frame object, a group of frame objects, or a specific type of frame object. In context of such examples, the layers of the graphic design can represent design elements that comprise the graphic design. Each layer can also be characterized by a set of attributes that reflect the visual appearance of the design element. The attributes of each layer can be selected or manipulated by users. By way of illustration, a user can modify individual layers by specifying (i) a numeric value to represent a line, corner or dimensional characteristic of a frame object; (ii) a color value (e.g., which can be formatted as HEX, HSB, HSL, CSS and RGB) for a background, or for a fill, line or shading attribute of an object; (iii) a shape characteristic; and/or (iv) a text string attribute.

The graphic design system can be utilized to create a graphic design for a production environment, such as for a functional user interface of a computing device. In a production environment, programmatic processes of an end computing device can render portions of a graphic design in context of providing a user with a functional user interface. Accordingly, production elements can be dynamic and undergo state changes in response to user interaction or other events. The graphic design system can enable user(s) to specify with the graphic design the different visual aspects of a production element that undergoes state change. Under one approach, the graphic design system can enable users to define a multi-state design element, termed a 'component', as a group of design elements, where each design element of the group is an instance of the multi-state component, and each instance differs from other instances of the group by the value of one or more attributes. In this way, each instance can be characterized by (i) a first set of one or more attributes that have values which are individually or in combination unique from the other instances of the group, and (ii) a second set of attributes that are the same amongst all of the instances of the groups. In some examples, each instance of the group can be termed a variant of the multi-state object, where the variant represents one of the states of the multi-state object.

In some examples, the operations include enabling a user to associate instances of a component with a variable data structure, and enabling a user to link a second object of the graphic design with the variable data structure. Further, the operations include performing a simulation of the graphic design when deployed in a production environment by (i) setting an active value for the variable data structure based on an attribute of an instance of the component; and (ii) automatically configuring an attribute of the second object based on the active value of the instance of the variable data structure.

Further, in some examples, the computer-implemented operations include associating a collection of variable data structures with a graphic design, where each variable data structure of the collection is associated with multiple values, including a corresponding first value for a first theme and a corresponding second value for a second theme. The operations further comprise rendering the graphic design in the first theme by assigning each variable data structure of the collection to the corresponding first value of the first theme, and in response to an event, rendering the graphic design in the second theme by assigning each variable data structure of the collection to the corresponding second value of the second theme.

Still further, in examples, a graphic design system enables a user to specify, during a design phase, an interaction with a multi-state design element. When the graphic design system is implemented in a simulation mode, the graphic design system performs a simulation of the graphic design being implementing in a production environment, where in response to detecting the interaction with respect to the multi-state design element, a state of the multi-state design element is changed in the simulation mode based on the variable data structure.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates a graphic design system, according to one or more examples. A graphic design system 100 ("GDS 100") as described with FIG. 1 can be implemented in any one of multiple different computing environments, including as a device-side application, as a network service, and/or as a collaborative platform. In examples, the GDS 100 can be implemented using a web-based application 80 that executes on a user device 10. In other examples, the GDS 100 can be implemented through use of a dedicated web-based application. As an addition or alternative, one or more components of the GDS 100 can be implemented as distributed system, such that processes described with various examples execute on both a network computer (e.g., server) and on the user device 10.

In examples, the GDS 100 includes processes that execute through a web-based application 80 that is installed on the computing device 10. The web-based application 80 can execute scripts, code and/or other logic to implement functionality of the GDS 100. Additionally, in some variations, the GDS 100 can be implemented as part of a network service, where web-based application 80 communicates with one or more remote computers (e.g., server used for a network service) to executes processes of the GDS 100.

In examples, a user device 10 includes a web-based application 80 that loads processes and data for providing the GDS 100 on a user device 10. The GDS 100 can include a rendering engine 120 that enables users to create, edit and update graphic design files.

In some examples, web-based application 80 retrieves programmatic resources for implementing the GDS 100 from a network site. As an addition or alternative, web-based application 80 can retrieve some or all of the programmatic resources from a local source (e.g., local memory residing with the computing device 10). The web-based application 80 may also access various types of data sets in providing functionality such as described with the GDS 100. The data sets can correspond to files and libraries, which can be stored remotely (e.g., on a server, in association with an account) or locally.

According to examples, a user of device 10 operates web-based application 80 to access a network site, where programmatic resources are retrieved and executed to implement the GDS 100. A user can initiate a session to implement the GDS 100 to view, create and edit a graphic design 135. Further, the user can simulate deployment of the graphic design 135 in a production environment. In some examples, the user can correspond to a designer that creates, edits and refines the graphic design for subsequent use in the production environment.

In examples, the web-based application 80 can correspond to a commercially available browser, such as GOOGLE CHROME (developed by GOOGLE, INC.), SAFARI (developed by APPLE, INC.), and INTERNET EXPLORER (developed by the MICROSOFT CORPORATION). In such examples, the processes of the GDS 100 can be implemented as scripts and/or other embedded code which web-based application 80 downloads from a network site. For example, the web-based application 80 can execute code that is embedded within a webpage to implement processes of the GDS 100. The web-based application 80 can also execute the scripts to retrieve other scripts and programmatic resources (e.g., libraries) from the network site and/or other local or remote locations. By way of example, the web-based application 80 may execute JAVASCRIPT embedded in an HTML resource (e.g., webpage structured in accordance with HTML 5.0 or other versions, as provided under standards published by W3C or WHATWG consortiums). In other variations, the GDS 80 can be implemented through use of a dedicated application, such as a web-based application.

The GDS 100 can include processes represented by programmatic interface 102, rendering engine 120, design interface 130, and simulation interface 132. Depending on implementation, the components can execute on the user device 10, on a network system (e.g., server or combination of servers), or on the user device 10 and a network system (e.g., as a distributed process).

The programmatic interface 102 includes processes to receive and send data for implementing components of the GDS 100. Additionally, the programmatic interface 102 can be used to retrieve, from local or remote sources, programmatic resources and data sets which include a workspace file 155 of the user or user's account. In examples, the workspace file 155 includes one or more data sets ("graphic design data set 157") that represent a corresponding graphic design 135 that can be rendered by rendering engine 120. The workspace file 155 can include one or more graphic design data sets 157 which collectively define the graphic design 135. The graphic design data set 157 can include one or more hierarchical data structures. In some examples, the graphic design data set 157 defines a collection of layers that comprise the graphic design 135, where each layer corresponds to an object, group of objects, or specific type of object (e.g., a component). Further, in some examples, the graphic design data set 157 can be organized to include graphic designs on screens, where each graphic design including one or more pages (e.g., with one canvas per page), or sections that include one or multiple pages.

According to an aspect, the programmatic interface 102 also retrieves programmatic resources that include an application framework for implementing the design interface 130. The design interface 130 can utilize a combination of local, browser-based resources and/or network resources (e.g., application framework) provided through the programmatic interface 102 to generate interactive features and tools that can be integrated with a rendering of the graphic design on a canvas. The application framework can enable a user to view and edit aspects of the graphic designs. In this way, the design interface 130 can be implemented as a functional layer that is integrated with a canvas on which the graphic design 135 is provided.

The design interface 130 can detect and interpret user input, based on, for example, the location of the input and/or the type of input. The location of the input can reference a canvas or screen location, such as for a tap, or start and/or end location of a continuous input. The types of input can correspond to, for example, one or more types of input that occur with respect to a canvas, or design elements that are rendered on a canvas. Such inputs can correlate to a canvas location or screen location, to select and manipulate design elements or portions thereof. Based on canvas or screen location, a user input can also be interpreted as input to select a design tool, such as may be provided through the application framework. In implementation, the design interface 130 can use a reference of a corresponding canvas to identify a screen location of a user input (e.g., 'click'). Further, the design interface 130 can interpret an input action of the user based on the location of the detected input (e.g., whether the position of the input indicates selection of a tool, an object rendered on the canvas, or region of the canvas), the frequency of the detected input in a given time period (e.g., double-click), and/or the start and end position of an input or series of inputs (e.g., start and end position of a click and drag), as well as various other input types which the user can specify (e.g., right-click, screen-tap, etc.) through one or more input devices.

In some examples, the rendering engine 120 and/or other components utilize graphics processing unit (GPU) accelerated logic, such as provided through WebGL (Web Graphics Library) programs which execute Graphics Library Shader Language (GLSL) programs that execute on GPUs. In variations, the web-based application 80 can be implemented as a dedicated web-based application that is optimized for providing functionality as described with various examples. Further, the web-based application 80 can vary based on the type of user device, including the operating system used by the user device 10 and/or the form factor of the user device (e.g., desktop computer, tablet, mobile device, etc.).

In examples, the rendering engine 120 uses the graphic design data set 157 to generate a rendering of the graphic design 135 for the design interface 130. Each of the design elements (or layers) of the graphic design 135 can be characterized by a set of attributes, where each attribute includes an attribute type and an attribute value. For an object, the types of attributes include, shape, dimension (or size), layer, type, color, line thickness, text size, text color, font, and/or other visual characteristics. Depending on implementation, the attributes reflect properties of two- or three-dimensional designs. In this way, attribute values of individual design elements or layers define visual characteristics of size, color, positioning, layering, and content.

The graphic design 135 can organize the graphic design by screens (e.g., representing production environment computer screen), pages (e.g., where each page includes a canvas on which a corresponding graphic design is rendered) or sections (e.g., where each screen includes multiple pages or screens). The user can interact with the design interface 130, to view and edit the graphic design 135. The design interface 130 can detect the user input, and the rendering engine 120 can update the graphic design 135 in response to the input. For example, the user can specify input to change a view of the graphic design 135 (e.g., zoom in or out of a graphic design), and in response, the rendering engine 120 updates the graphic design 135 to reflect the change in view. The user can also edit the graphic design 135. The design interface 130 can detect the input, and the rendering engine 120 can update the graphic design data set 157 representing the updated design. Additionally, the rendering engine 120 can update the graphic design 135, such that the user instantly sees the change to the graphic design 135 resulting from the user's interaction.

Collaborative Environment

In examples, the GDS 100 can be implemented as part of a collaborative platform, where a graphic design can be viewed and edited by multiple users operating different computing devices at locations. As part of a collaborative platform, when the user edits the graphic design 135, the changes made by the user are implemented in real-time to instances of the graphic design on the computer devices of other collaborating users. Likewise, when other collaborators make changes to the graphic design, the changes are reflected in real-time with the graphic design data set 157. The rendering engine 120 can update the graphic design 135 in real-time to reflect changes to the graphic design by the collaborators.

In implementation, when the rendering engine 120 implements a change to the graphic design data set 157, corresponding change data 111 representing the change can be transmitted to the network system 150. The network system 150 can implement one or more synchronization processes (represented by synchronization component 152) to maintain a network-side representation 151 of the graphic design. In response to receiving the change data 111 from the user device 10, the network system 150 updates the network-side representation 151 of the graphic design, and transmits change data 121 to user devices of other collaborators. Likewise, if another collaborator makes a change to the instance of the graphic design on their respective device, corresponding change data 111 can be communicated from the collaborator device to the network system 150. The synchronization component 152 updates the network-side representation 151 of the graphic design, and transmits corresponding change data 121 to the user device 10 to update the graphic design data set 157. The rendering engine 120 then updates the graphic design 135.

In examples, the graphic design data set 157 includes a set of variable data structures 159 that are associated with the graphic design 135. Each variable data structure 159 can be of a value type (e.g., number value, string value, hexadecimal, Boolean, etc.). Each variable data structure 159 can also be associated with one or multiple values of the corresponding value type.

Variable Data Structure

In more detail, the variable data structure 159 of the graphic design data set 157157 can be associated with one or multiple aspects of a graphic design. In some examples, a variable data structure 159 can have a tabular or row-wise structure, with at least one column providing a corresponding value of the variable data structure. As described in some examples, each variable data structure 159 can have multiple corresponding values, in which case the variable data structure includes multiple columns with each column identifying a different corresponding value for the variable data structure.

Collection(s) of Variable Data Structures

Further, in examples, the graphic design data set 157 can include a collection of variable data structures, where each variable data structure of the collection having one or more corresponding values. The collection of variable data structures can be structured as a multidimensional table, with each variable data structure being defined in part by a corresponding value (or set of values), with the corresponding value(s) of each variable data structure 159 being provided in a respective column.

Thematic Value Sets for Collection(s)

The columnar sets of values for the variable data structures 159 of the collection can also be separately linked to a theme or thematic set. The value assigned to the variable data structures 159 of the collection can be switched from one thematic set to another. A user can interact, via the design interface 130, with the variable data structure 159 or collection to select alternative thematic sets for variable data structures of the collection. For example, the design interface 130 can enable the user to interact with a tabular data structure representing a collection of variable data structures, by enabling the user to specify or select the corresponding value of individual variable data structures for the thematic set. Alternatively, the design interface can enable the user to toggle between alternative thematic sets of values for variable data structures of the collection.

In examples, the corresponding value for each variable data structure 159 can determine a visual attribute of a corresponding layer of the graphic design. In one aspect, collections of variable data structures 159 are used to enable variations to a given graphic design, to accommodate, for example, production environments where the attributes of the design elements vary for aesthetic, design or functional reasons. There are various scenarios where variations to a graphic design 135 are warranted or desired. In cases where, for example, the graphic design is for a user computing environment, the graphic design can vary amongst the population of users based on the hardware being used (e.g., mobile device versus laptop versus desktop, etc.), as well as the operating systems and/or platforms used by the computing devices of the users. Thus, hardware, operating system and type of computing environment can represent alternative production environments for a graphic design where a designer may be motivated to alter aspects of the graphic design to accommodate preferences or requirements for each of the environments. Alternative sets of graphic designs can also be used in cases where there may exist alternative branding in the production environment. Still further, alternative sets of graphic designs can enable implementation of alternative modes in the production environment, such as light and dark mode implementations of a same application.

Variable Data Structure Association to Determine Attributes

In examples, users can specify stateful aspects of a graphic design using the design interface 130. The stateful aspects of a graphic design can define (i) the visual appearance of a graphic design in a current state; (ii) actions/events that cause a stateful aspect of the graphic design to change state; and/or (iii) rendering of graphic design in a next state following an action or event. In examples, the graphic design can include multiple top layers, each of which represent a page or a screen on which graphic design is implemented in the production environment. Further, the graphic design can include multiple stateful layers that can visually change state during implementation in the production change. For example, an icon can change color or size in response to an action corresponding to a click action or hover action. The user can interact with the design interface 130 to specify logical associations that comprise the various states of the graphic design. The user input can specify sequences that define transitions between different layers, actions that cause specific state changes, and changes in attributes of layers to reflect state changes. The user can also link variable data structures 159 to stateful layers that are to change in attribute (e.g., change color or shading). In such case, the value set of the linked variable data structure 159 can define the change to the layer. The user input can also specify the sequence or manner in which the values of the variable data structure are to be used to change corresponding attributes of the linked layer.

The design interface 130 enables users to create variable data structures 159, as well as associations between variable data structures 159 and layers of a graphic design. In some examples, the variable data structures 159 can be created by user input. Alternatively, the variable data structures 159 can be received from a network source (e.g., a collaborator, an external source, etc.), and the user can provide input to link select layers to corresponding variable data structures. A user can create such associations for layers that are intended to be stateful in a production environment. The variable data structures 159 can be selected or configured to define an attribute of a layer in each of multiple states. Each state of a stateful layer can be represented by a value of a linked variable data structure 159. Thus, a stateful layer of the simulated environment can change states based on the alternative values of the linked variable data structure 159. Further, the attributes of stateful design elements are dynamically determined based on the attribute of other design elements (e.g., such as a component or multistate design element).

In examples, the association between a variable data structure 159 and a layer can be one where the selected value of the variable data structure 159 determines an attribute of a linked layer. For example, the variable data structure 159 can specify a set of numeric values to represent alternative states of layers, where variation amongst states is based on an attribute such as size/dimension, line characteristic and/or corner characteristic. In a variation, the variable data structure 159 can specify a set of color values (e.g., hexadecimal) to represent alternative states of layers, where variations amongst states is based on a color attribute (e.g., for fill, line color, etc.). Alternatively, the variable data structure 159 can specify a string value to represent alternative states of layers, where variations amongst states is based on a text attribute or content. Still further, the variable data structure 159 can specify a Boolean value for an attribute of a linked layer or layer. In this way, a variable data structure 159 can associate multiple values with a given layer, where each value is associated with a state of the layer. The user can also specify logical relationships as to an order or sequence in which the individual values of the variable data structure's value set are to be 'active' to reflect the current state of the linked layer. For example, in the case of a soft button that has a fill color that is to change from black to grey to blue in response to a click action, the particular value that is active in a given state reflects the rendered color of the soft button at that moment. Additionally, the logical relationships specified through the design interface 130 can also form a basis for generating programming code and other data sets for implementing the graphic design in a production environment.

The rendering engine 120 can implement a simulation mode to dynamically render, via the simulation interface 132, the graphic design in a manner that is interactive and representative of a production environment where the graphic design 135 is to be deployed. In other words, a simulation mode can be enabled during a design phase of the graphic design, where the simulation mode simulates implementation of the graphic design in a production or runtime environment. Further, with at least some examples, the simulation mode can be dynamic in that the attributes of stateful elements are based on the values of other stateful elements.

In generating a simulation of a graphic design, the rendering engine 120 renders, via the simulation interface 132, portions of the graphic design that corresponds to, for example, display screens of the production environment. Prior to rendering the simulation mode, the user(s) can specify state relationships between, layers, and between layers and variable data structures. Once the simulation mode is initiated, the simulation interface 132 can receive user input and/or detect other events (e.g., the passage of time) to perform state changes to the simulated graphic design based on the user-specified logical relationships. The state changes can include responsively to user input, transition between screens and indicate changes in attributes to individual layers based on variable data structures associated with the variable data structures. In examples, use of variable data structures 159 to represent stateful design elements is visualized in a simulation mode.

The simulation interface 132 can render stateful design elements to include attributes that are based on active values of their respective variable data structures 159. The variable data structure 159 of each stateful design element can include multiple values, each of which define an attribute that at least partially defines the state of the design element. The simulation interface 132 can include logic that determines, for each variable data structure 159, an initial or default value of the corresponding value set, and a subsequent value after a state transition is to change the attribute of the respective layer. The particular value of the variable data structure may be referenced as the 'active' value. Accordingly, when a variable data structure 159 includes multiple values, the active value can represent the particular value used to render the associated layer in a particular state during a simulation rendering.

In some examples, the rendering engine 120 can enable a user to interact with the design interface 130 to specify an association between a layer of the graphic design and the variable data structure 159, where the association sets the active value of the variable data structure 159 based at least in part on a designated or specified attribute of the value-setting layer. Further, the rendering engine 120 can enable the user to specify, with respect to a layer, an action or event to cause the active value of a variable data structure to be set by an attribute of the specified layer or layer. For example, the user can specify "click" or "hover" as an action or event to trigger a change to the active value of the variable data structure 159. The alternative value that is selected to be active can be determined from, for example, an attribute of the associated layer where the user input or interaction (e.g., click, hover) is received. In this way, during simulation mode, the active value (representing a current state of the linked layer) of the variable data structure 159 can be determined by the attribute of value-setting layer.

As described, when the simulation mode is implemented, the rendering engine 120 simulates rendering of pages or screens of the graphic design in a production environment. The user can interact with the layers of the simulated design in a manner that simulates user-interaction with a corresponding functional user-interface of a production environment. The simulated design can include stateful layers that can change state in response to user input and other events. The value of the stateful layers can be based on the value sets of associated variable data structures. To simulate user interactions, the rendering engine 120 can utilize corresponding variable data structures 159, as well as logical relationships associated with the variable data structure 159, to determine the state of the stateful layers. The rendering engine 120 renders the graphic design to reflect state changes that can occur with respect to the graphic design.

In examples, the logical relationships specified between individual layers and corresponding variable data structures include a relationship where an attribute of a layer, as rendered in the simulation mode, is based on the value sets of the variable data structure 159. In connection with such logical relationships, the user can also specify user inputs or events with are received in connection with the associated layer, to trigger implementation of the logical relationships. For example, the logical relationship can designate an attribute of a layer as providing, for purpose of simulation, a basis for a value of a variable data structure when a particular type of input is received on the layer in the simulation mode. In this way, the logical relationships can include relationships where, for purpose of simulation, the active values of variable data structures are set by attributes of corresponding layers. Further, the active values of the variable data structures can be determined in response to designated user interactions with respect to the simulated rendering of the corresponding layer. For example, in the simulation mode, a user's selection with a first layer can trigger a second layer to change values, based on the association of the first layer and the variable data structure 159, and the link between the variable data structure 159 and the second layer In examples, variable data structures 159 can allow for the use of expressions with values sets. The expressions can include mathematical and/or logical expressions. Further, the expression values of the variable data structure can incorporate the active values of others variable data structures of the graphic design. In some examples, the simulation interface 132 determines the value of the logical expression for the variable data structure in response to inputs or other events that change the value. By way of example, the expressions can include mathematical operations where the value of one or multiple other variable data structures are added, subtracted, divided, multiplied, averaged, etc. Thus, in some cases, when the simulation mode is implemented. an attribute of a different layer (as represented by a different variable data structure) can partially determine the active value of the variable data structure for a given stateful layer. Still further, the expression can include mathematical operations to modify a value for an attribute. In some variations, the expression for a particular variable data structure can incorporate conditional logic, such as conditional logic that determines the active value of the variable data structure based on another condition (e.g., value of another variable data structure). Still further, the expression for a particular variable data structure can incorporate nested logical expressions, such as conditional statements with nested logical and/or mathematical operations. Further, the logical expressions can resolve to particular data type, such as numerical, color value, or string value.

Methodology

FIG. 2A illustrates an example method for utilizing a variable data structure with a graphic design, according to one or more embodiments. FIG. 2B illustrates an example method for utilizing a variable data structure to determine an attribute of a design element, according to one or more embodiments. FIG. 2C illustrates an example method for utilizing a variable data structure to simulate a graphic design in a production environment, according to one or more embodiments. In describing examples of FIG. 2A through FIG. 2C, reference is made to elements of FIG. 1 for purpose of illustrating suitable components and functionality for performing a step or sub-step.

With reference to FIG. 2A, in step 204, the GDS 100 provides a design interface for enabling users to view, create and edit a graphic design.

In step 208, the GDS 100 associates a collection of variable data structures with the graphic design. Each variable data structure can be associated with one or multiple design elements of the graphic design. Further, each variable data structure of the collection can be assigned to multiple values, and each of the multiple values can be associated with values of a particular type (e.g., numeric, string, color value, Boolean, etc.). In examples, the multiple values of each variable data structure include a first value for a first theme and a corresponding second value for a second theme.

In step 212, the GDS 100 renders the graphic design in accordance with the first theme by assigning each variable data structure of the collection to the corresponding first value of the first theme.

In response to user input (e.g., theme change input) or other event, in step 216, the GDS 100 renders the graphic design in accordance with the second theme by assigning each variable data structure of the collection to a corresponding second value of the second theme. As described with some examples, the user can switch between thematic values of a collection using, for example, interactive features such as a menu feature.

In examples, the GDS 100 enables a collection of variable data structures to be updated by a user, account holder or by a remote source of the collection. The GDS 100 can also enable a user or account holder can update a collection that is originally received from a third-party or remote source. In some variations, once a user or account holder updates a particular variable data structure of the collection, subsequent update to the collection can cause the GDS 100 to selectively update the collection. For example, in updating the collection by an original source, the GDS 100 can exclude select variable data structures that were most recently updated by the user, account holder or alternative source. In this way, GDS 100 can implement the variable execution logic 122 or other processes to apply updates to collections selectively, to exclude, for example, updates to variable data structures that were updated by the user or another source.

With reference to FIG. 2B, in step 220, the GDS 100 provides a design interface to render at least a portion of a graphic design. While the graphic design is rendered, in step 224, the GDS 100 enables a user to associate a first layer of the graphic design with a variable data structure. The first layer can include a component that is associated with multiple instances, where the multiple instances collectively define multiple states that are associated with the component. The multiple states may reflect, for example, a production environment feature that is represented by the component, where the production environment feature changes state based on events and/or user input.

In step 228, the GDS 100 enables the user to link or otherwise associate a second layer of the graphic design with the variable data structure, where the second layer is different than the first layer, and where the second layer includes an object that is different than the component of the first layer. Each of the first layer and the second layer can correspond to, for example, an object, group of objects, or specific type of object. Likewise, each of the first layer and the second layer can correspond to, for example, a frame object or combination of frame objects (e.g., parent and child objects), or top-level frame (e.g., page or screen of objects).

In step 232, the GDS 100 performs a simulation of the graphic design when deployed in a production environment. In performing the simulation, the GDS 100 can determine an active value of the variable data structure based on an attribute of the first layer. Additionally, the GDS 100 can automatically configure an attribute of the second layer based on the active value of the variable data structure.

With reference to an example of FIG. 2C, in step 236, the GDS 100 provides a design interface to render at least a portion of a graphic design. In step 240, the GDA 100 implements a variable data structure for use with the graphic design, where the variable data structure is defined at least in part by a value type and one or more values. In step 244, the GDS 100 links a multi-state design element having multiple states with the variable data structure, such that each of the multiple states is based at least in part on a corresponding value of the value type.

Example Interfaces

FIG. 3A through FIG. 3F and FIG. 4 illustrate various examples for implementing a graphic design system, according to one or more embodiments. In describing examples of FIG. 3A through FIG. 3F and FIG. 4, reference is made to elements of FIG. 1 for purpose of illustrating suitable components for implementing features and functionality as described with the examples.

Figures 3A, 3B:
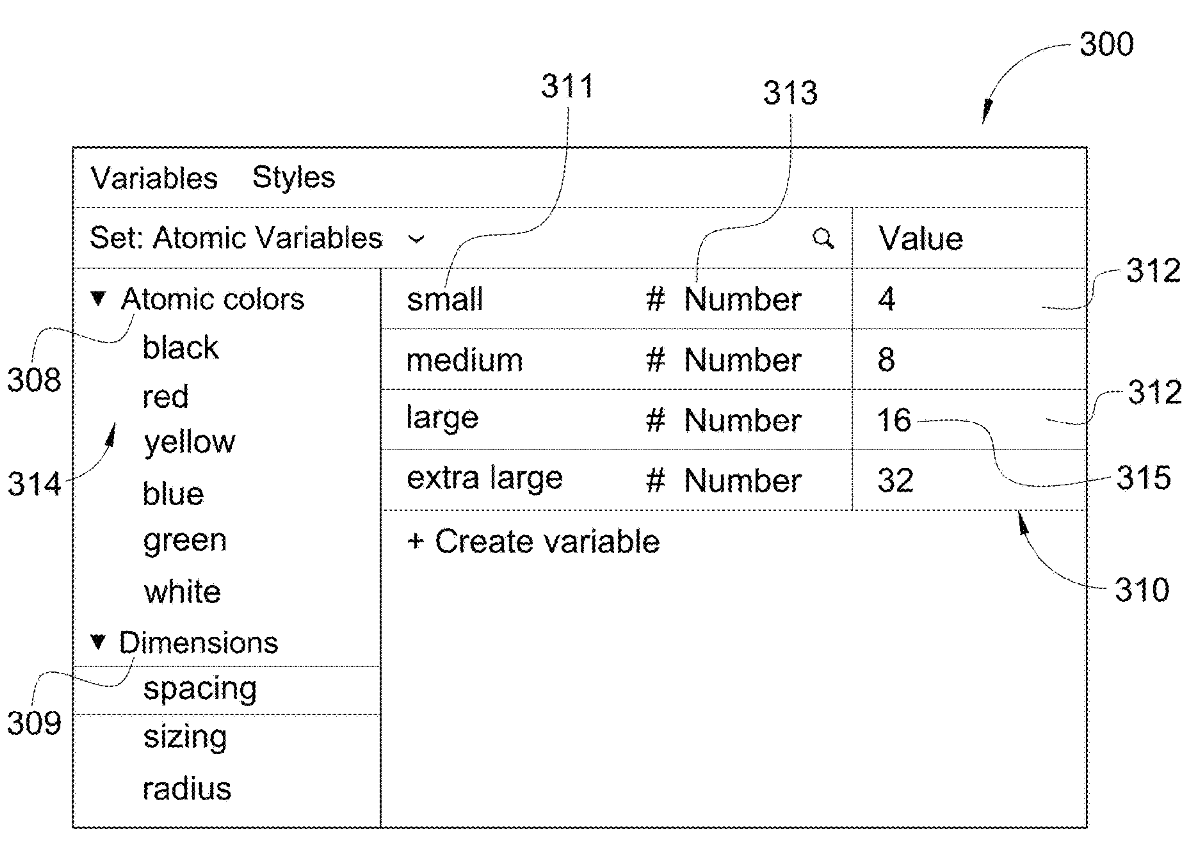
FIG. 3A illustrates an example graphic design interface for utilizing collections of variable data structures in a graphic design system, according to one or more embodiments.
FIG. 3B illustrates a panel interface to enable a user to define variable data structures, according to one or more embodiments.

FIG. 3A illustrates an example graphic design interface 300 for displaying information about collections of variables for a computing device. In examples, a graphic design interface 300 is generated in connection with a user interacting with the GDS 100 (via a corresponding user device 10) to edit a graphic design. In an example shown, the graphic design interface 300 utilizes multiple collections 310, with each collection including one or multiple variable data structures 312. Each variable data structure 310 can include an identifier 311, a data type 313 (e.g., number, string, color, Boolean, etc.) and one or more values 315 of the data type. The collection 310 can be a tabular data structure, with each row corresponding to a variable data structure, and each column corresponding to a corresponding set of values for the variable data structures of the collection. In some implementations, each collection 310 can be edited to include additional columns (or values) for each variable data structure of the collection. Further, each collection 310 can be edited to include additional rows (or variable data structures) with corresponding assigned values. Still further, the attributes or values of individual variable data structures can be modified by the user.

The graphic design interface 300 can include a panel 314 or list to enable users to view and/or edit the collections 300 that are associated with a particular graphic design file, or alternatively, with a user or user account. The collections 310 can be organized by category and sub category labels 308, 309 (or other descriptors). Individual collections (or portions thereof) can be specified by a user, a collaborator (a user operating a different computing device and collaborate on the same graphic design), or a third-party. In some examples, a third-party can communicate one or more collections 310 to individual users (or their respective computing devices). For example, the GDS 100 can employ a programmatic application interface (e.g., REST API) to receive collections (and updates thereof) of variable data structures from selected or designated third-party sources.

FIG. 3B illustrates a panel interface 320 to define variable data structures. The panel 320 can provide an interface to enable a user to view, edit or create a variable data structure. In an example shown, the panel 320 enables the user to provide an identifier 321 and additional descriptors, as well as a designation of attribute type (e.g., spacing, sizing, radius) For layers that are to be associated with the variable data structure. Thus, when a user associates a layer (e.g., radius) With the variable data structure, the attribute of the layer that is to be represented by the variable data structure will be designated by the variable data structure itself.

Figure 3C:
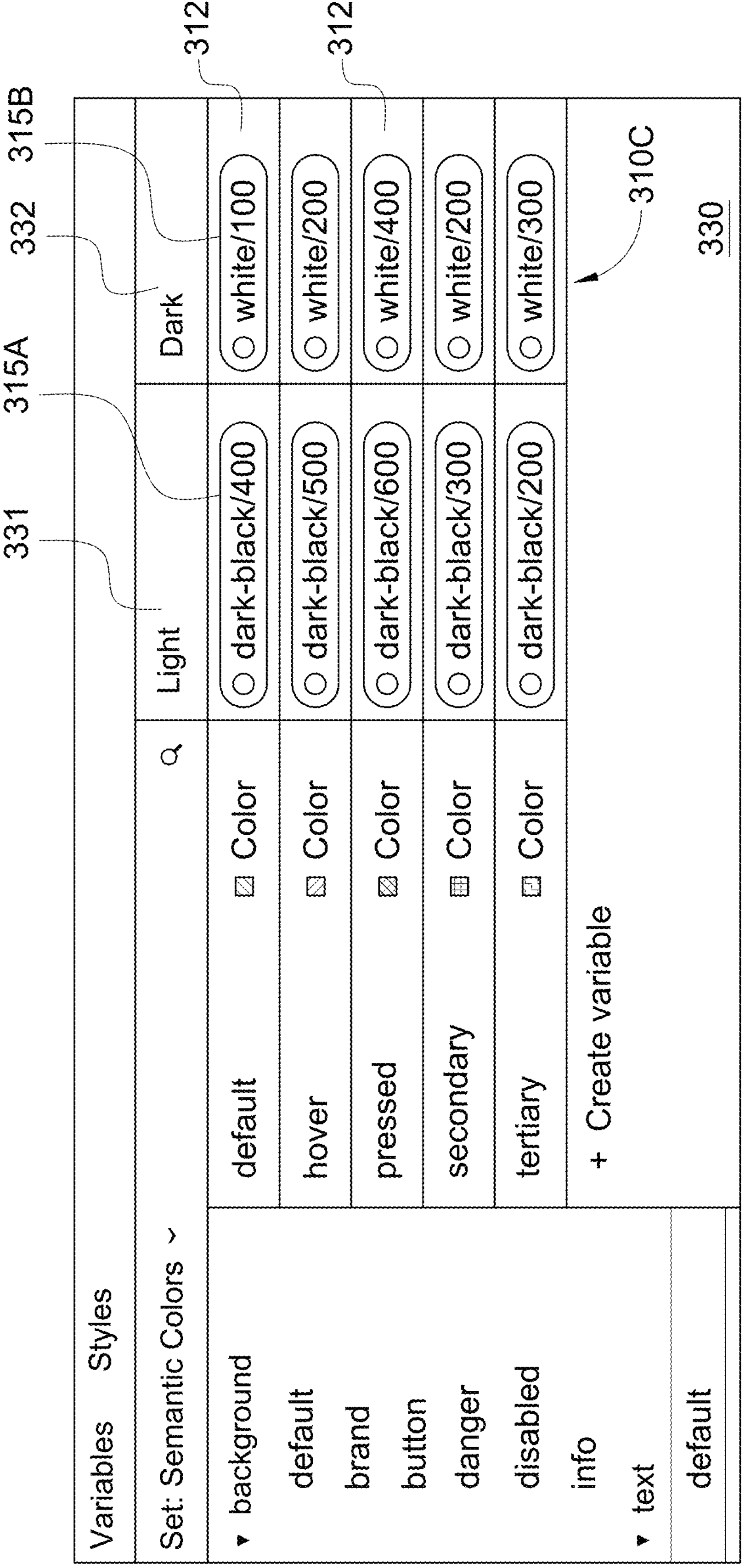
FIG. 3C illustrates an interface for displaying a collection that includes multiple variable data structures, according to one or more embodiments.

FIG. 3C illustrates an interface 330 for displaying a collection 310C that includes multiple variable data structures 313, where each variable data structure 312 includes multiple alternative (or possible) values 315A, 315B. The collection 310C can be structured such that each columns 331, 332 of the collection are associated with a theme. When each column 331, 332 of respective values is associated with a corresponding theme (e.g., light theme, dark theme), devalues that comprises column can be selected at one time, such that each variable data structure 312 of the collection has a value associated with the same theme. In some examples, the interface 330 can include or otherwise be associated with a selection mechanism that enables the user to switch between thematic sets of values for the variable data structures 312 of the collection 310. For example, a designer may toggle between light or dark mode for a graphic design simply by selecting between columns 331 or 332 of the interface 330.

In examples, the columns 331, 332 of a collection can represent alternative thematic value sets for the variable data structures of the collection. For example, the thematic value sets can represent alternative modes (e.g., light mode, dark mode) for implementing the graphic design in the production environment. For such thematic sets, the collection 310 includes variable data structures 312 that have a color data type and include each of a corresponding first set of values that represent corresponding colors of a first theme (e.g., light mode), and a second set of values that represent corresponding colors of a second theme (e.g., dark mode). Through use of a collection that includes alternative thematic value sets for variable data structures, a designer can more efficiently view and edit a graphic design for all alternative implementation modes. For example, a designed may only need to edit one layer for a first type of attribute (e.g., corner shape), in order to have the modified layer available for use in both light and dark mode. The use of thematic value sets can be made for all types of variable data structures, to accommodate different types of variations which may be required for a graphic design in a production environment. For example, alternative variations to the graphic design may be required to accommodate (i) different operational modes (e.g., light mode, dark mode), (ii) multiple display sizes (e.g., compact for mobile devices versus large for desktops), (iii) permutations between platforms and operating systems, (iv) skews in color rendering between different computing environments, and/or (v) differences in capability or functionality of different computing environment.

Accordingly, as an addition or variation, the collection 310 can include variable data structure 312 that have numeric value types that reflect a shape, size (e.g., dimension on one or two axes), spacing, position or other numeric attribute. The thematic value sets can render alternative versions of a graphic design, where shapes, size and/or positioning of layers differ to reflect variations to a production-environment implementation of the graphic design. The variations can reflect, for example, (i) accommodations for alternative types of computing devices (e.g., mobile device with smaller screens may require a user-interface that embodies the graphic design to be compressed to accommodate a display screen size), and (ii) differences in presentation for different computing platforms.

As additional illustrative examples, thematic value sets can include Boolean values for variable data structures, where, for example, the Boolean value indicates whether the attribute or feature identified by the corresponding variable data structures to be on or off (e.g., rendered or not rendered in the production environment). Thus, for example, in a mobile environment, the features available to the user may be reduced to accommodate the small screen size.

Figure 3D:
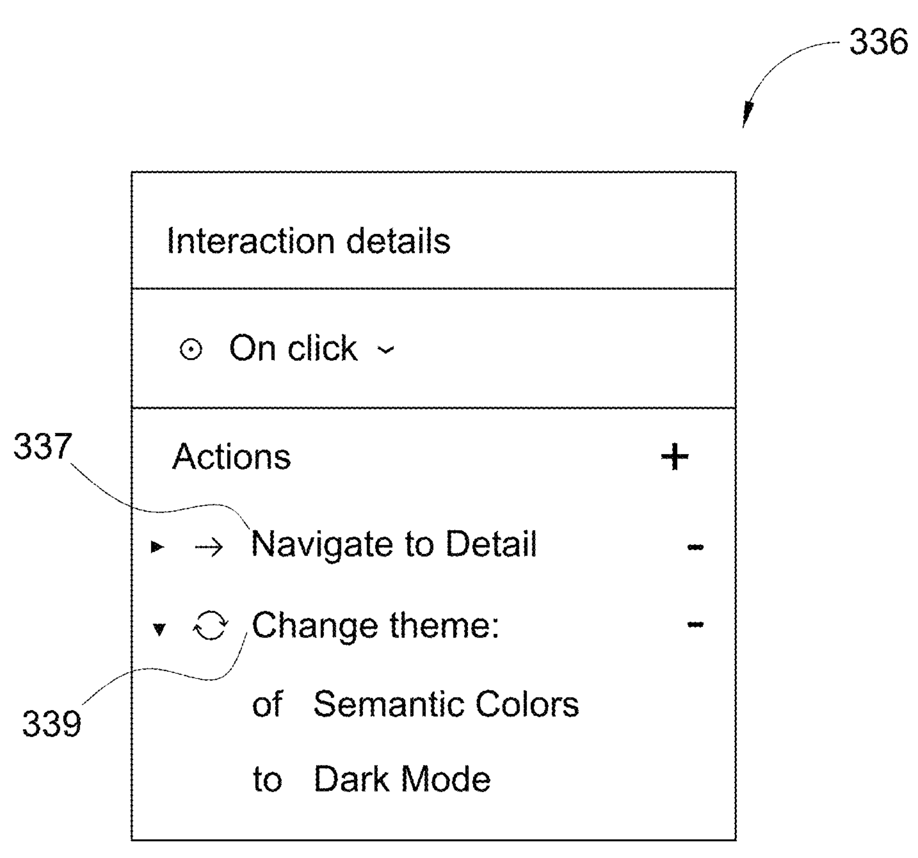
FIG. 3D illustrates a panel to enable a user to switch thematic value sets of variable data structures of a collection, according to one or more embodiments.

FIG. 3D illustrates a panel to enable a user to switch the value sets of variable data structures for a collection. The panel 336 can be provided with, for example, the design interface 310. The panel 336 can include a feature 337 to enable the user to select a particular collection (e.g., "semantic colors"), and a feature to select the value sets of the collection from one value set associated with a current theme (e.g., "light mode") to another theme (e.g., "dark mode").

Figure 3E:
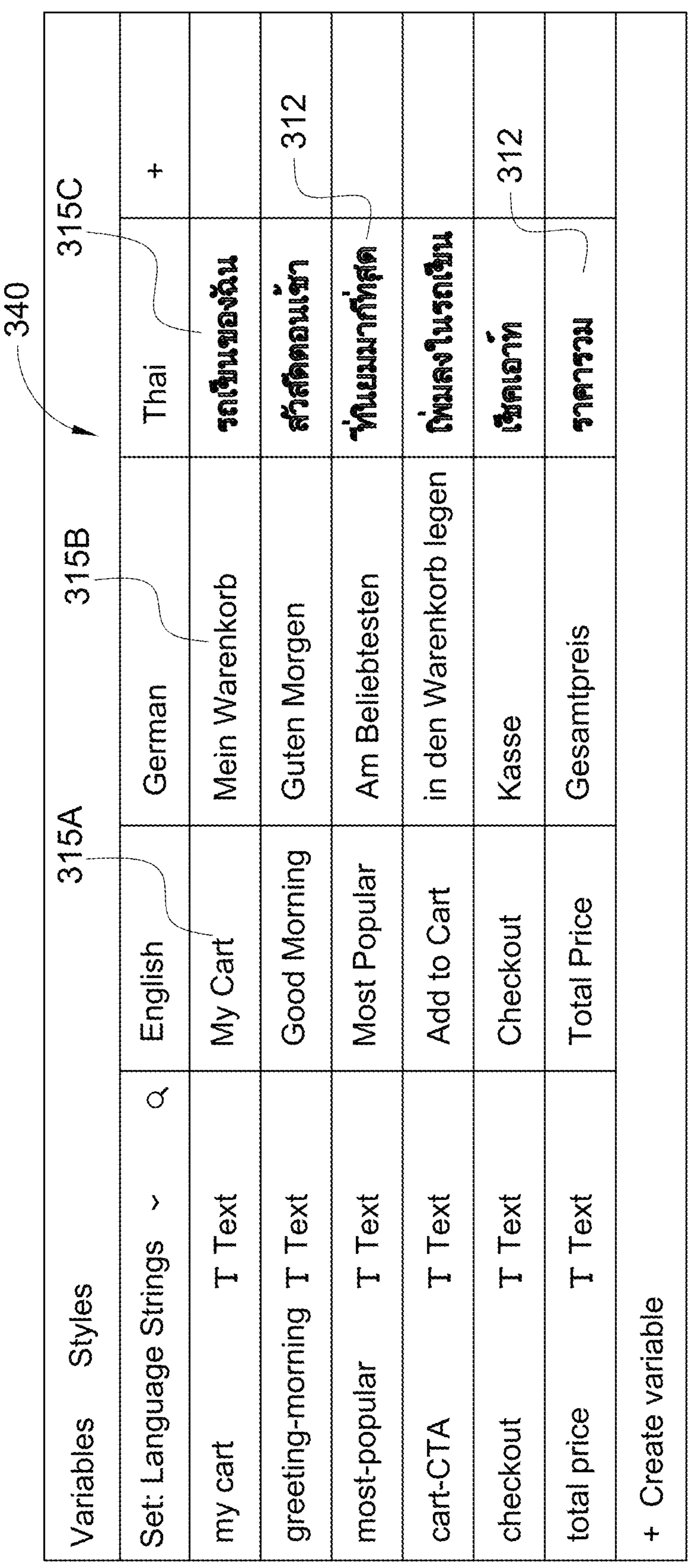
FIG. 3E illustrates an example interface for utilizing thematic values for a collection of variable data structures having a string value data type, according to one or more embodiments.

FIG. 3E illustrates an example interface 340 for utilizing thematic values for a collection 310 of variable data structures 312 having a string value data type. In an example shown, the variable data structures 312 include alternative string values 315A, 315B, 315C of the same content in alternative languages (e.g., English, French, German, etc.). The thematic value sets can determine the language of text content provided with a screen, page or other portion of a graphic design.

FIG. 3F illustrates application of expressions for determining the value of a stateful layer, according to one or more examples. In FIG. 3F, a user can interact with a design interface to set the value of a variable data structure to be an expression. In an example shown, a portion of the graphic design corresponding to a screen 355 is rendered for the design interface 130. Further, a separate variable/property panel 358 can be provided with the design interface to enable the user to configure the variable data structures and logic for implementing stateful design elements in a simulation mode. The panel 358 can, for example, enable the user to specify state change or values through the occurrence of an action 359 and the designation of a variable data structure (e.g., "fullprice", "figplantcount" and "figplantprice"). In examples, the expression sets the value of the variable "fullprice" to be the product of a variable "figplantcount" and "figplantprice". The expression can resolve to a number that is rendered as content for the layer 351. In this way, the layer 351 can be a stateful layer that includes content that represents the current value of a user's shopping cart. The interface 350 can be designed to include interactive and stateful elements, including item selection features 349 and total amount layer 351. During the simulation mode, the user can interact with the item selection layer 349 to select a number of fig plants. The item selection layer 349 can include sub-layer elements 347*a*, 347*b*, and the sub-layer elements 347*a*, 347*b* can be associated by a click action with a corresponding variable data structure "figplantcount". The variable data structure for "figplantcount" can include an expression value that maintains the count for the number of items selected. By way of illustration, the expression for "figplantcount" can increase the value of "figplantcount" in response to a click action with the sub-layer elements 347A, and decrease the value "figplantcount" in response to a click action with the sub-layer 347B.

As shown by the example, a logical expression is provided for the stateful elements, where the logical expression resolves into a dynamic value based on state changes (e.g., such as provided by a user) that occur during a simulation rendering of the graphic design. In this way, aspects of the simulation rendering are dynamically determined as state changes (e.g., responsive to user input) occur during the simulation. While an example is shown to resolve the dynamic expressions into a number, in variations, the dynamic expressions can be used to resolve into any one of multiple types of values, including string values, Boolean values, etc. Further, the logical expressions can include various types of logic, including Boolean logic and arithmetic.

When the simulation mode is implemented, in response to the value of "figplantcount" changing, the content of the layer 351 also changes state, with the content reflecting the monetary value of the user's selections (which coincide with numeric values for the respective items). When the simulation mode is initially implemented, for example, the layer 351 can have a content that renders "$0", with the number of items being selected being "0". Subsequently, as the user interacts with sub-elements 347*a*, 347*b*, the variable data structure "figplantcount" is iterated, and the active value of the layer 351 is calculated based on the expression value for the corresponding variable data structure (e.g., "figplantcount" * "figplantprice"). In an example shown, the user may also be able to interact with, for example, "figcountprice" to directly manipulate the value rendered. The simulation engine 132 can cache, for example, the active value and utilize the active value in determining the active values of other variable data structures which depend on that active value.

Figure 4:
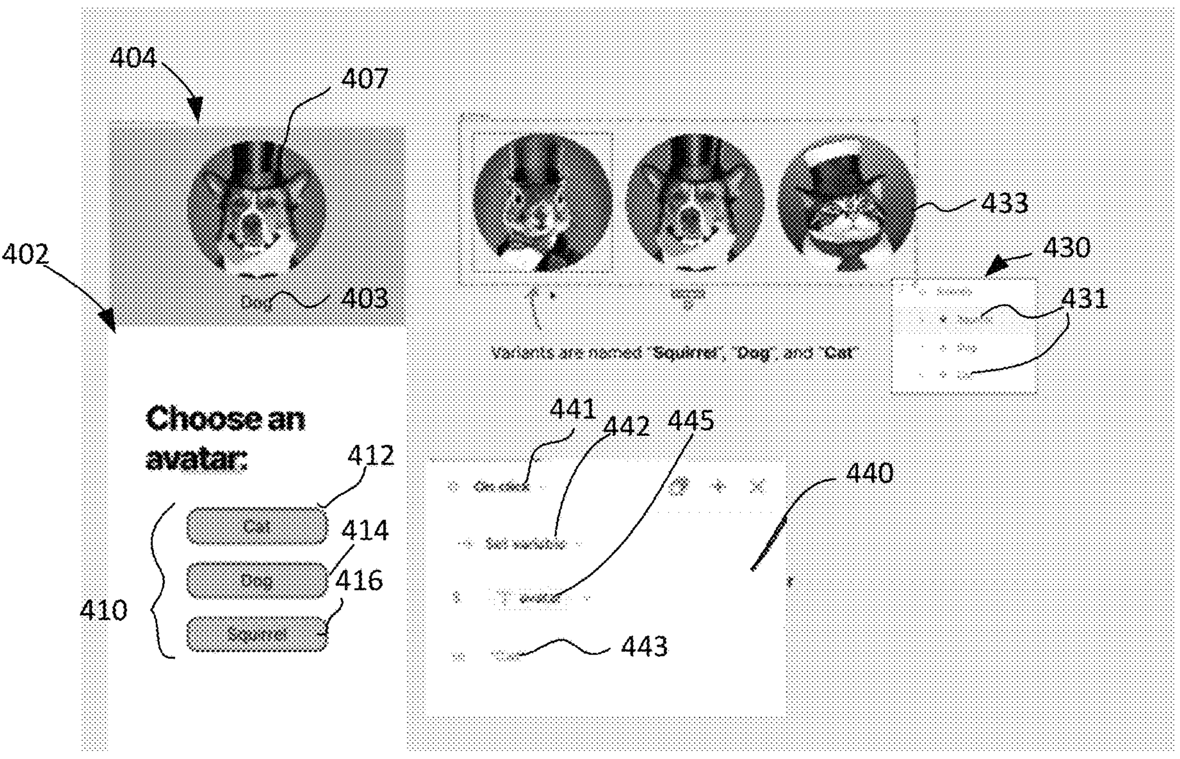
FIG. 4 illustrates another example in which a graphic design system utilizing variable data structures, in accordance with one or more embodiments.

FIG. 4 illustrates another example in which a graphic design system utilizing variable data structures, in accordance with one or more embodiments. With reference to FIG. 4, a portion of a graphic design is shown rendered on a canvas of a design interface. The graphic design includes multiple layers that include a screen layer 402, an avatar layer 404, a set of button layer 410 that include a cat button layer 412, a dog button layer 414, and a squirrel button layer 416. The avatar layer 404 can include elements corresponding to a label 403 (string value) and a graphic content component 407. Each button of the set of button layers 410 includes a string attribute corresponding to text content of a frame object. Additionally, the graphic design includes a variant component layer ('animals') 430, which comprises variants that include a squirrel variant 432, the dog variant 434 and a cat variant 436. The attributes of the sublayers can include respective text string identifiers 431 and images 433.

In an example shown, a variable input panel 440 can be provided as part of the design interface 130 (see FIG. 1) to enable the user to specify and configure the logical relationships between specific layers and variable data structures. A user can interact with variable input feature 440 of the design interface 130 (see FIG. 1) to structure a logical relationship between a given layer and a corresponding variable data structure. By interacting with the variable input feature 440, the user can specify an action 441 (e.g., on click, hover, double-click, etc.) to trigger an association between the respective layer (e.g., cat button layer 412) and an identified variable data structure 445 (e.g., variable data structure labeled "avatar" or "avatar variable"). Further the user can provide input 442 that specifies the nature of the logical relationship. In the example shown, the nature of the logical relationship is that in response to the action 441 performed on the cat button layer 412, the associated variable data structure is set to have a particular value 443. The particular value 443 can correspond to a string value (e.g., "cat") that is specified by the designer when interacting with the input feature 440. In variations, the particular value 443 for the avatar variable can be based on an attribute of the value setting layer. For example, a string attribute of the cat layer 412 ("cat") can be extracted and used as the identified value 443 for the respective variable data structure.

The variable input panel 440 can enable a designer to create and configure similar logical relationships as between the avatar variable and each of the dog button layer 414 and the squirrel button layer 416. For example, the user can interact with the variable input feature 440 to specify a corresponding action 441 (e.g., click), the variable data structure that is associated with the relationship (e.g., 'variable avatar') and the string value that is to be set for the avatar value upon the selected action being performed.

In the case of the avatar layer 404, the text element 403 can be set by the avatar variable 445. In examples, additional logic can be employed with the simulation interface to link the graphic content component 407 with an object that has a matching string identifier. Thus, the string identifier can identify one of the variant objects, and the graphic content component 407 can use an image of the variant with the text identifier that matches the specified string value 443.

Once the logical relationship is configured, the rendering engine 120 can implement a simulation mode to render a simulation of the graphic design. During a simulation, a designated portion of the graphic design (e.g., screen layer 402) is displayed on a simulated display screen (e.g., for mobile device). The user can interact with (e.g., click) any of the set of button layers 410 to cause a string value of the avatar variable 445 to be set by the particular value 443 associated with the respective soft button layer 412, 414, 416 (e.g., "dog", "cat", "squirrel"). During simulation, the text string element 403 of the avatar layer may be set by the string value of the button layer that is clicked. Further, the simulation interface 132 (see FIG. 1).

Network Computer System

Figure 5:
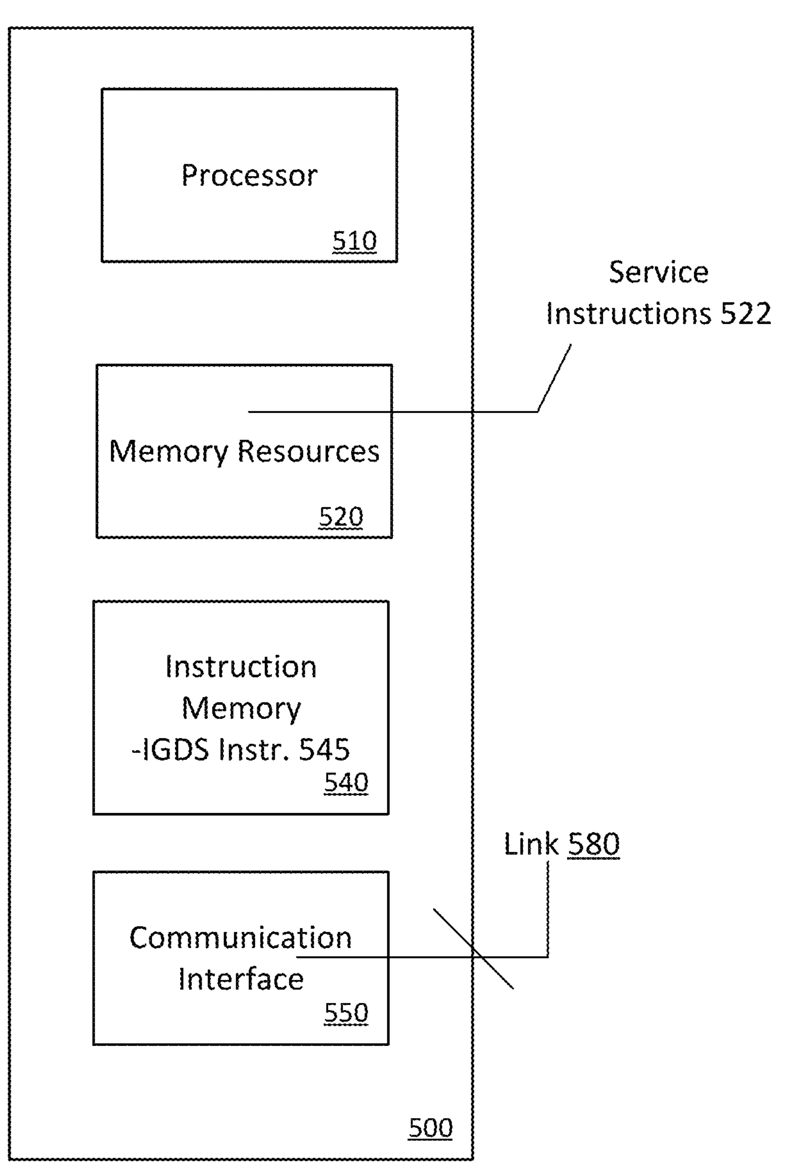
FIG. 5 illustrates a computer system on which one or more embodiments can be implemented.

FIG. 5 illustrates a computer system on which one or more embodiments can be implemented. A computer system 500 can be implemented on, for example, a server or combination of servers. For example, the computer system 500 may be implemented as the network computing system 150 of FIG. 1A through FIG. 1C.

In one implementation, the computer system 500 includes processing resources 510, memory resources 520 (e.g., read-only memory (ROM) or random-access memory (RAM)), one or more instruction memory resources 540, and a communication interface 550. The computer system 500 includes at least one processor 510 for processing information stored with the memory resources 520, such as provided by a random-access memory (RAM) or other dynamic storage device, for storing information and instructions which are executable by the processor 510. The memory resources 520 may also be used to store temporary variables or other intermediate information during execution of instructions to be executed by the processor 510.

The communication interface 550 enables the computer system 500 to communicate with one or more user computing devices, over one or more networks (e.g., cellular network) through use of the network link 580 (wireless or a wire). Using the network link 580, the computer system 500 can communicate with one or more computing devices, specialized devices and modules, and/or one or more servers.

In examples, the processor 510 may execute service instructions 522, stored with the memory resources 520, in order to enable the network computing system to implement the network service 172 and operate as the network computing system 170 in examples such as described with FIG. 1A through FIG. 1C.

The computer system 500 may also include additional memory resources ("instruction memory 540") for storing executable instruction sets ("IGDS instructions 545") which are embedded with web-pages and other web resources, to enable user computing devices to implement functionality such as described with the system 100.

As such, examples described herein are related to the use of the computer system 500 for implementing the techniques described herein. According to an aspect, techniques are performed by the computer system 500 in response to the processor 510 executing one or more sequences of one or more instructions contained in the memory 520. Such instructions may be read into the memory 520 from another machine-readable medium. Execution of the sequences of instructions contained in the memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

User Computing Device

Figure 6:
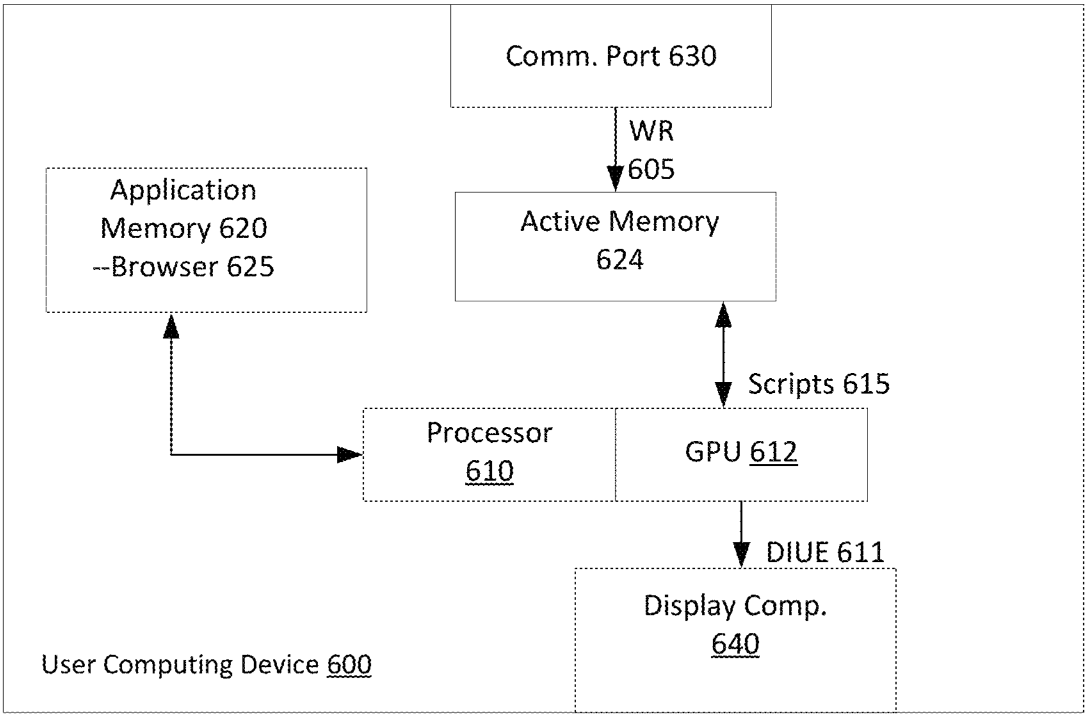
FIG. 6 illustrates a user computing device for use with one or more examples, as described.

FIG. 6 illustrates a user computing device for use with one or more examples, as described. In examples, a user computing device 600 can correspond to, for example, a work station, a desktop computer, a laptop or other computer system having graphics processing capabilities that are suitable for enabling renderings of design interfaces and graphic design work. In variations, the user computing device 600 can correspond to a mobile computing device, such as a smartphone, tablet computer, laptop computer, VR or AR headset device, and the like.

In examples, the computing device 600 includes a central or main processor 610, a graphics processing unit 612, memory resources 620, and one or more communication ports 630. The computing device 600 can use the main processor 610 and the memory resources 620 to store and launch a browser 625 or other web-based application. A user can operate the browser 625 to access a network site of the network service 152, using the communication port 630, where one or more web pages or other resources 605 for the network service 152 (see FIG. 1A through FIG. 1C) can be downloaded. The web resources 605 can be stored in the active memory 624 (cache).

As described by various examples, the processor 610 can detect and execute scripts and other logic which are embedded in the web resource in order to implement the system 100 (see FIG. 1A through FIG. 1C). In some of the examples, some of the scripts 615 which are embedded with the web resources 605 can include GPU accelerated logic that is executed directly by the GPU 612. The main processor 610 and the GPU can combine to render a design interface under edit ("DIUE 611") on a display component 640. The rendered design interface can include web content from the browser 625, as well as design interface content and functional elements generated by scripts and other logic embedded with the web resource 605. By including scripts 615 that are directly executable on the GPU 612, the logic embedded with the web resource 615 can better execute the system 100, as described with various examples.

CONCLUSION

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computer system comprising:
one or more processors;
a memory to store a set of instructions;
wherein the one or more processors are operable to execute the instructions stored in the memory, to cause the computer system to perform operations that include:
providing a design interface for a graphic design;
enabling a user to associate a first layer of the graphic design with a variable data structure, the first layer including a component that is associated with multiple instances that collectively define multiple states that are associated with the component;
enabling a user to link a second layer of the graphic design with the variable data structure, the second layer being different than the first layer, and the second layer including an object that is different than the component;
performing a simulation of the graphic design being deployed in a production environment by (i) setting an active value for the variable data structure based on an attribute of one of the multiple instances of the component; and (ii) automatically configuring an attribute of the object of the second layer based on the active value of the variable data structure.

2. The computer system of claim 1, wherein the operations further comprise:
enabling the user to specify an event or condition when associating the first layer with the variable data structure; and
wherein setting the active value of the variable data structure is performed in response to occurrence of the event or condition.

3. The computer system of claim 2, wherein the event or condition corresponds to an occurrence of a user interaction, and wherein setting the value of the variable data structure is performed in response to occurrence of the user interaction.

4. The computer system of claim 1, wherein the operations further comprise:
enabling the user to associate multiple layers of the graphic design, including the first layer, with the variable data structure;
for each of the multiple layers, enabling the user to specify an interaction when associating the layer with the variable data structure; and
wherein performing the simulation of the graphic design includes detecting multiple user interactions with the multiple layers, and in response to detecting each of the multiple user interactions, setting the active value of the variable data structure based on an attribute value of a corresponding layer of the multiple layers where the interaction is received.

5. The computer system of claim 4, wherein performing the simulation includes:
in response to detecting each of the multiple interactions, automatically changing the attribute of another layer of the multiple layers based on the active value of the variable data structure.

6. A computer-implemented method comprising:
providing a design interface for a graphic design;
enabling a user to associate a first layer of the graphic design with a variable data structure, the first layer including a component that is associated with multiple instances that collectively define multiple states that are associated with the component;
enabling a user to link a second layer of the graphic design with the variable data structure, the second layer being different than the first layer, and the second layer including an object that is different than the component; and
performing a simulation of the graphic design being deployed in a production environment by (i) setting an active value for the variable data structure based on an attribute of one of the multiple instances of the component; and (ii) automatically configuring an attribute of the object of the second layer based on the active value of the variable data structure.

7. The computer-implemented method of claim 6, wherein the operations further comprise:
enabling the user to specify an event or condition when associating the first layer with the variable data structure; and
wherein setting the active value of the variable data structure is performed in response to occurrence of the event or condition.

8. The computer-implemented method of claim 7, wherein the event or condition corresponds to an occurrence of a user interaction, and wherein setting the value of the variable data structure is performed in response to occurrence of the user interaction.

9. The computer-implemented method of claim 6, wherein the operations further comprise:
enabling the user to associate multiple layers of the graphic design, including the first layer, with the variable data structure;
for each of the multiple layers, enabling the user to specify an interaction when associating the layer with the variable data structure; and
wherein performing the simulation of the graphic design includes detecting multiple user interactions with the multiple layers, and in response to detecting each of the multiple user interactions, setting the active value of the variable data structure based on an attribute value of a corresponding layer of the multiple layers where the interaction is received.

10. The computer-implemented method of claim 9, wherein performing the simulation includes:
in response to detecting each of the multiple interactions, automatically changing the attribute of the second layer based on the active value of the variable data structure.

11. A non-transitory computer-readable medium that stores instructions, which when executed by one or more processors of a computer system, cause the computer system to perform operations comprising:
providing a design interface for a graphic design;
enabling a user to associate a first layer of the graphic design with a variable data structure, the first layer including a component that is associated with multiple instances that collectively define multiple states that are associated with the component;
enabling a user to link a second layer of the graphic design with the variable data structure, the second layer being different than the first layer, and the second layer including an object that is different than the component; and
performing a simulation of the graphic design being deployed in a production environment by (i) setting an active value for the variable data structure based on an attribute of one of the multiple instances of the component; and (ii) automatically configuring an attribute of the object of the second layer based on the active value of the variable data structure.

12. The non-transitory computer-readable medium of claim 11, wherein the operations further comprise:

enabling the user to specify an event or condition when associating the first layer with the variable data structure; and wherein setting the active value of the variable data structure is performed in response to occurrence of the event or condition.

13. The non-transitory computer-readable medium claim 12, wherein the event or condition corresponds to an occurrence of a user interaction, and wherein setting the value of the variable data structure is performed in response to occurrence of the user interaction.

14. The non-transitory computer-readable medium of claim 11, wherein the operations further comprise:

enabling the user to associate multiple layers of the graphic design, including the first layer, with the variable data structure;

for each of the multiple layers, enabling the user to specify an interaction when associating the layer with the variable data structure; and wherein performing the simulation of the graphic design includes detecting multiple user interactions with the multiple layers, and in response to detecting each of the multiple user interactions, setting the active value of the variable data structure based on an attribute value of a corresponding layer of the multiple layers where the interaction is received.

15. The non-transitory computer-readable medium of claim 14, wherein performing the simulation includes:

in response to detecting each of the multiple interactions, automatically changing the attribute of the second layer based on the active value of the variable data structure.

* * * * *